Patented Feb. 25, 1941

2,232,699

UNITED STATES PATENT OFFICE 2,232,699

PROCESS FOR STABILIZING SOLUTIONS CONTAINING ASCORBIC ACID AND THE PRODUCTS THEREOF

William H. Engels and John Weijlard, Rahway, and Remsen T. Schenck, Millington, N. J., assignors to Merck & Co. Inc., Rahway, N. J., a corporation of New Jersey No Drawing. Application November 10, 1936, Serial No. 110,112

3 Claims. (Cl. 99—11)

This invention relates to processes and preparations intended for the stabilization of ascorbic acid.

It has been known that ascorbic acid readily decomposes in most solutions and more especially in solutions containing water, and that such decomposition is greatly accelerated progressively as temperatures applied to the solutions are increased. It has, in fact, been established, that ascorbic acid, in aqueous solutions of about the strength of 4 mgms. of the acid per 100 cc. of water, will be entirely decomposed after boiling for even so short a period as about three minutes.

This greatly limits the adaptability of ascorbic acid to the preparation of foods, medicines, and pharmaceutical preparations which contain ascorbic acid or in which it is desired to incorporate substantial quantities of that acid.

We have now found that the deterioration of the vitamin can be prevented, or at least greatly retarded, by the addition of a small quantity of a water-soluble organic colloid. When the ascorbic acid is to be added to aqueous food and medicinal mixtures, the stabilizing agents of the type herein contemplated are generally not objectionable for internal administration because many of these are in themselves very generally used as ingredients in food and pharmaceutical mixtures, and their use, therefore, does not involve the employment of ingredients which could be considered as wholly foreign to such mixtures. Thus for the special purposes of the instant application, for the preparation of foods and the like, it is desirable to avoid such foreign materials as chemical antioxidants for instance.

The general nature of the inventive thought herein involved may be more definitely indicated by the enumeration of some of the group of colloids which have been found effective. Such group includes casein, gelatin, albumen, blood albumin, raw milk, starch, acacia, etc., either individually or in mixtures with one another, preferably in aqueous solution. It will be understood, of course, that although each of the class of materials mentioned has been found to be suitable for inhibiting or retarding the decomposition of the acid at temperatures considerably above normal, the degree of such protection, which they individually afford, varies somewhat as to the colloids employed. The most effective and generally satisfactory results are obtained with acacia and casein in aqueous solutions. Perhaps the most efficient of all is casein as it exists naturally in raw milk.

The decomposition of ascorbic acid in solutions, at high temperatures, is either entirely or very substantially inhibited by the practice of our invention. For example, if it is desired to prepare a solution of about 4 mgms. of ascorbic acid in 100 c. c. of water, it will be found that the addition of an organic colloid of the types indicated will prevent or retard such decomposition of the acid even when the solution is boiled for as long as from 3 to 10 minutes. Thus, in such a solution containing about 3% of acacia, the loss of ascorbic acid after boiling will be found to be less than 10%. Under similar conditions, such a solution containing 3% of blood albumin shows a loss of only about 5%, while a solution containing raw milk shows even a lower loss. The quantity of the organic colloid to be added may obviously be varied to meet any given requirements.

The particular stabilizing agent to be employed should be selected in accordance with the nature of the solution containing ascorbic acid or to which the acid is to be added. As an example, it may be said that acacia will be found very satisfactory for addition to fruit juices, while in the case of broths and other foods of protein origin, gelatin or blood albumin will be found preferable. In the case of hot beverages such as hot chocolate, etc., the addition of a raw-milk solution of the acid will be found highly satisfactory and convenient.

It will be seen that the method of incorporating ascorbic acid thus protected against deterioration in solution by any of the named and related colloids will also lend itself to practical utilization in the case of solutions and preparations which are to be subjected to pasteurization.

The illustrations herein presented are preferred embodiments of the application of the principle of the invention and are obviously susceptible of considerable variation in the selection and combination of different available colloids in the modification of the relative quantities and the choice of material to be fortified with the stabilized acid, without departing from the spirit and scope of the invention.

We claim as our invention:

1. Foodstuffs fortified with ascorbic acid stabilized by a water-soluble colloid of the group consisting of albumen, blood albumin, acacia, casein, raw milk, gelatin and starch.

2. Solutions of ascorbic acid stabilized by water-soluble, edible colloids.

3. The method of inhibiting the decomposition of ascorbic acid in solution which comprises stabilizing the same by means of a water-soluble colloid.

WILLIAM H. ENGELS.
JOHN WEIJLARD.
REMSEN T. SCHENCK.